United States Patent [19]

Krieger

[11] Patent Number: 4,811,643
[45] Date of Patent: Mar. 14, 1989

[54] GUIDE FOR HAND MANIPULATED POWERED CUTTING TOOLS

[76] Inventor: George A. Krieger, 1103 S. 43rd Ave., Yakima, Wash. 98908

[21] Appl. No.: 147,536

[22] Filed: Jan. 25, 1988

[51] Int. Cl.4 ............................................. B27B 9/04
[52] U.S. Cl. ...................................... 83/745; 83/574; 83/522; 30/374
[58] Field of Search ............... 83/745, 574, 455, 522; 30/374; 33/96, 112, 41 F, 42

[56] References Cited

U.S. PATENT DOCUMENTS 2,773,523 12/1956 Hopla ..................................... 83/745
4,056,028 11/1977 Patterson .............................. 83/745
4,539,881 9/1985 Maier ..................................... 83/745
4,608,902 9/1986 Ivey ................................... 83/745 X Primary Examiner—Donald R. Schran
Attorney, Agent, or Firm—Keith S. Bergman

[57] ABSTRACT

A tool having an elongate guide blade and perpendicular head for alignment with the sides of a work piece is provided to guide a hand-operated cutting-type powered tool in making straight cuts. The head is reversible relative to the guide blade to allow use with tools which have guide structure on opposite sides of a cutting tool. The guide blade provides frictional material on its lower surface to aid positional maintenance on a work piece. A measuring device to indicate position of a tool cut is provided by a replaceable dowel that is cut off by a particular tool being used with the device.

1 Claim, 2 Drawing Sheets

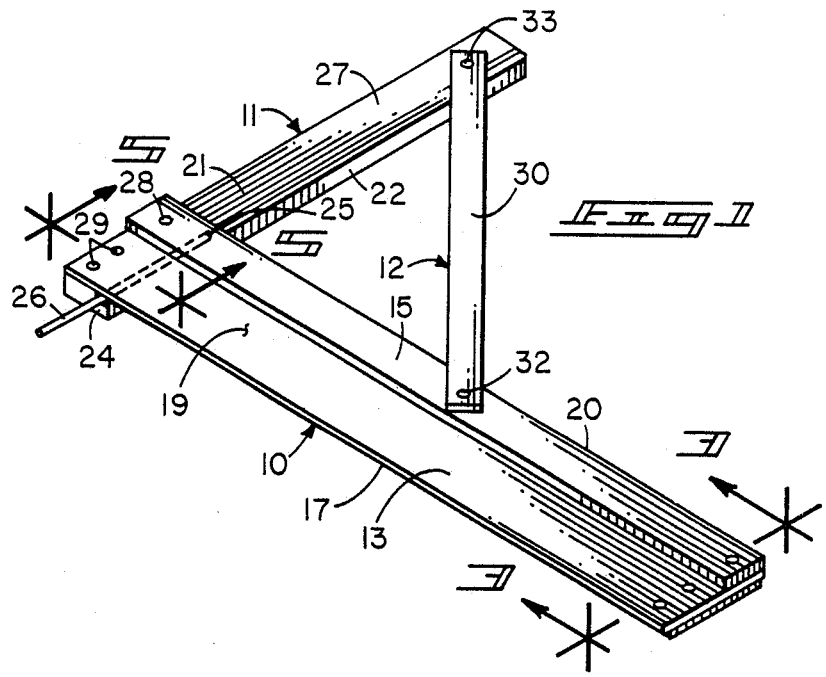
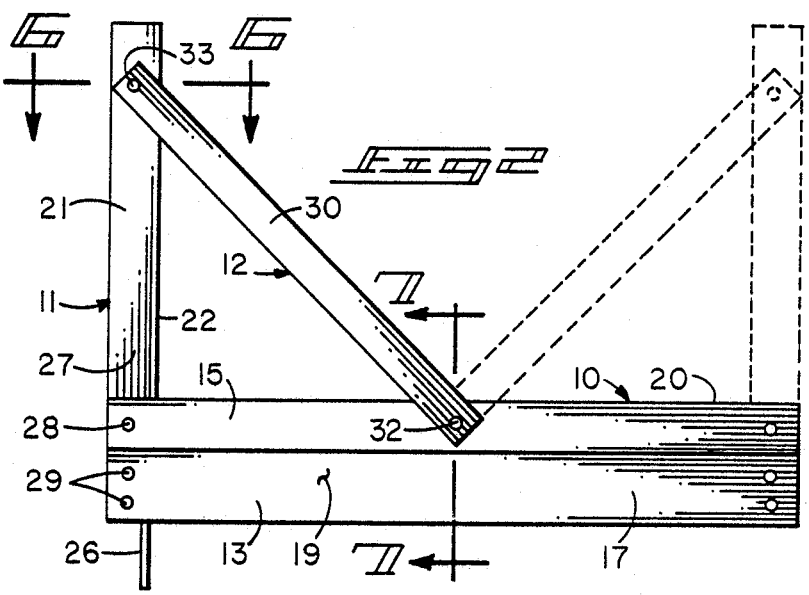
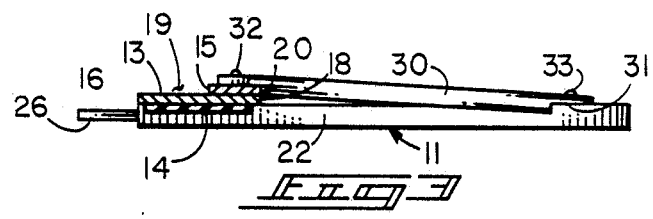

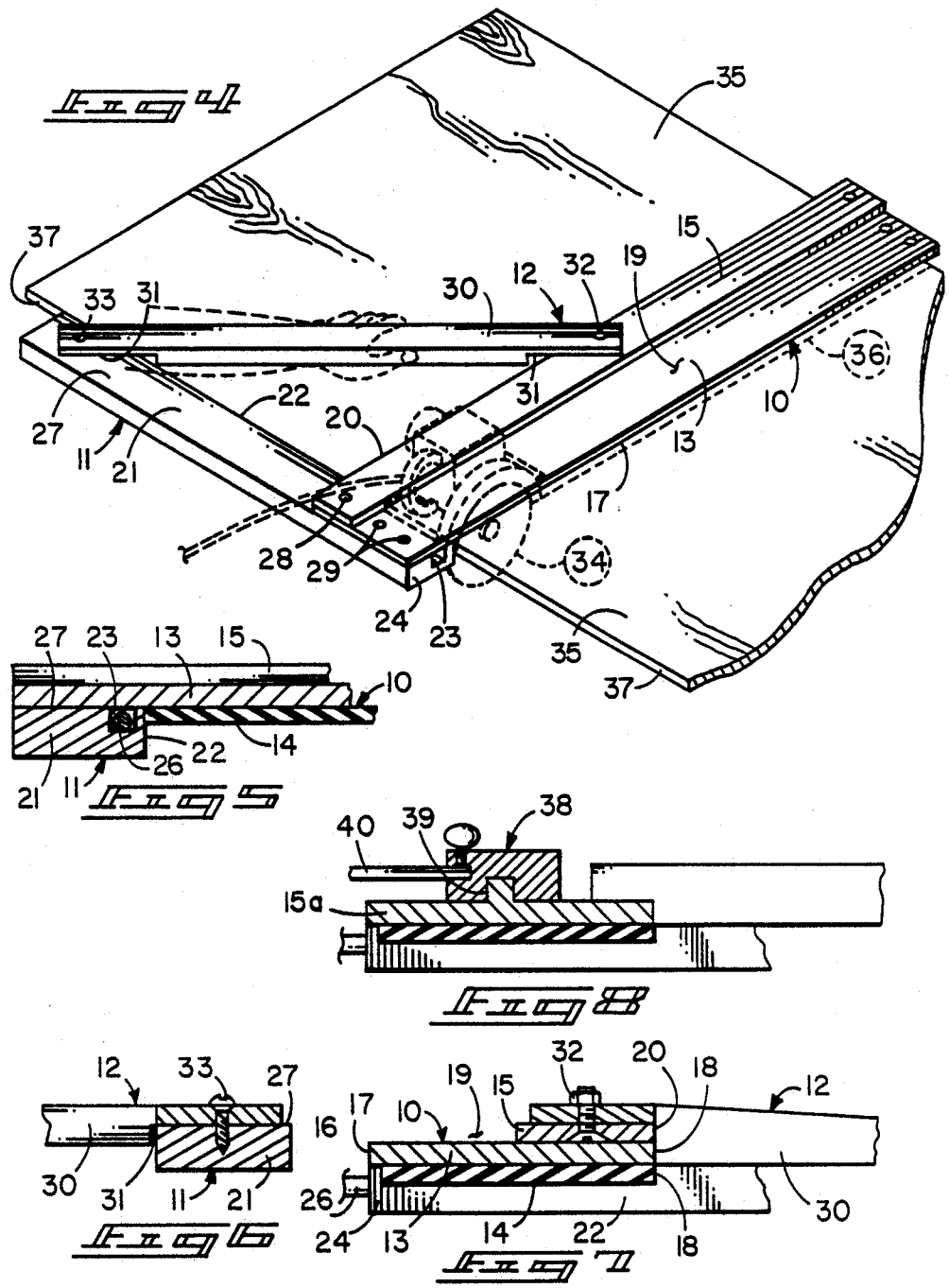

GUIDE FOR HAND MANIPULATED POWERED CUTTING TOOLS

BACKGROUND OF INVENTION

1. Related Applications

There are no applications related hereto heretofore filed in this or any foreign country.

2. Field of Invention

My invention relates to guides for hand operated powered cutting tools and more particularly to a guide that supports such a tool above a work piece and indicates cut position by a replaceable element that is cut to indicator length by a particular tool.

BACKGROUND AND DESCRIPTION OF PRIOR ART

Manually manipulated, motor driven cutting tools have increased in popularity and use substantially since their development. They present a problem in their use, however, in that it is commonly desired that a cut made with them should be linear and often be perpendicular to an adjacent edge of a work piece being cut. It is often difficult to accomplish this result without mechanical aids and responsive to the problem, many and various tools to mechanically aid the process have come into existence to guide such tools. The instant invention provides a device of this class that is of a particular, improved nature.

Commonly, hand manipulated powered saws have devolved into two general types, the first being a direct drive type saw with the motor in line either directly or parallel to the axis of the saw blade and a second type providing a worm gear drive with the motor positioned perpendicular to the axis of the saw blade. The first type of saw commonly provides a running guide on the left side of the saw blade with a cut being made to the right of this running guide, whereas the second type of saw commonly provides a running guide on the right side with a cut being made to the left of the running guide. For a saw guide to be universally applicable, it must accommodate both types of saw guide structures. The instant guide does do this, and yet maintains all of its other functions, by providing a head that may be releasably positioned at either end of a particular guide blade structure.

My tool guide also, by reason of this structure, may be quite effectively used with other manually manipulatable powered cutting tools, such as routers, saber saws, planes and the like. These latter types of tools commonly provides some sort of guide structure on one side or the other of the cutter element, similar to the running guides on saws, that may be accommodated and guided by my invention.

Commonly with many blade-type guide structures for use with hand manipulated power tools, slippage of the guide blade relative to a work piece has heretofore presented a problem. Commonly in operating such a power tool, the operator necessarily has one hand, usually that of major dexterity, occupied in moving the hand tool and this leaves only the other hand, of lesser dexterity, to positionally maintain a guide structure. Some guide structures have attempted to solve this problem by providing a type of releasable mechanical interconnection to the work piece, but in general this has not proven to be a particularly good or universal solution to the problem as it is inconvenient of use, oftentimes may mar a work piece and may not be attachable to all work pieces. My invention solves this problem by providing a frictional element of some areal extent on the work contacting undersurface of the guide blade structure. This aids positional maintenance of that guide blade structure, not only by reason of manipulation by the free hand of an operator, but also as accentuated by pressure on the guide blade itself, caused by moving the hand tool thereover. This tool pressure may be increased by appropriate manual manipulation of a tool, if necessary.

Prior art devices have provided means to aid positional maintenance by way of frictional engagement of the tool, but in general they have not had the function described for the instant device as a tool has not been supported on the frictional element.

Commonly in working with tool guide structures, it is desired to use such devices, and the tools which they guide, upon relatively finely finished surfaces. .n such use, neither the guide structure nor the tool may mar the work piece, if either or both are to serve their purposes effectively. My invention solves this problem by means of the frictional element which aids in positional maintenance of the device. This element is of some areal extent and of a semi-resilient nature, such as to protect a work piece immediately adjacent thereto. My device also eliminates the problem of marring by a tool being used with it by providing a particular compound guide blade structure which defines a channel within which a tool moves such that the guide blade itself is constantly between the surface being worked upon and the tool being guided. This structure prevents any part of a guided tool from coming into direct contact with the work piece so that the tool guide structure cannot mar or otherwise deface the surface of a work piece. Prior art devices generally have not provided such a work piece protection feature for both the guide structure and the tool being guided.

A problem arises with the use of various hand tools that are guided by a guide structure in determining exactly where a particular tool will operate or cut and especially in predetermining such location before any cut is made in the work piece that might deface it in an undesirable area. This problem is exacerbated with many hand tools because there has been no standardization of them concerning the position of a cut relative to that tool's running guide structure. Because of this, any indicating device must generally be related to a particular tool and in general to accommodate this situation, most indicating devices have been of an adjustably positionable nature. Such type of indicator tends to present inherent problems firstly, in determining its initial setting and secondly, in properly maintaining that setting during a period of use since the adjustment may readily be changed accidentally after establishment. The instant invention solves this problem differently then the prior art by providing a cuttable indicating device, such as a wooden dowel, projecting outwardly from the head of the guide, beyond its guide blade structure where a tool being guided by the device will make a cut. A particular tool to be guided is then merely run down the guide structure and allowed to cut the projecting indicating dowel at the normal position of cut of the tool, so that that dowel will then serve as an absolute guide structure for determining tool cut position, as the dowel end will be at that cut position without any calculation or secondary measurement being required. Individual dowels may be saved and maintained for use with particular tools, or more commonly, new dowels may be used with each particular session of tool operation as the dowels are inexpensive, readily replaceable and readily formable.

Most hand manipulated powered tools may be guided simply by manually maintaining a part of the tool guide structure against a straight edge. Some such tools, however, especially such as routers, tend to create substantial lateral forces that may tend to move such a tool away from the guide tool blade. A species of my invention provides a guide blade with a relatively thin guiding edge structure which may accept a grooved fixture that in turn may be secured to a tool to be guided to prevent lateral motion relative to the blade. The prior art generally seems not to have addressed this problem in linear guide tools.

My invention resides not in any one of these particular features or structures per se, but rather in the synergistic combination of all of them to provide the functions necessarily flowing therefrom and hereinafter further specified and claimed.

SUMMARY OF INVENTION

My invention generally provides an elongate tool guiding blade and a perpendicularly extending head carried at one end with a support communicating therebetween to maintain alignment and rigidity. The blade carries frictional material of some areal extent on its lower, work contacting surface and defines a channel on its upper surface over which the running guide of a tool moves in its guided course. The tool head may be positioned at either end of the guiding blade to accommodate powered tools having guide structure on either side of their cutting blades. My tool's head provides a releasably positioned, laterally projecting indicator member that is cut by a power tool to be guided to indicate the position of that tool's cut on a work piece.

In creating such a device, it is:

A principal object of my invention to provide a blade-type tool guide for use with manually manipulated powered tools having a cutting element on either the right or left side of a guide structure.

A further object of my invention to provide such a tool that has a frictional element of substantial areal extent beneath the tool guiding blade to aid the positional maintenance by an operator of that blade upon a work piece.

A further object of my invention to provide such a tool that may have the head structure positioned at either end of the guiding blade for use with tools having lateral guide structure on either side of a cutting blade.

A further object of my invention to provide such a device that has releasably positionable cut indicating structure that is cut off by a particular tool to indicate the position of a future cut to be made by that tool relative to the guiding blade of my tool.

A still further object of my invention to provide a species of guiding blade with a ridge upon which a fixture attached to a powered tool may slide to maintain absolute lateral position of the powered tool relative to the guiding blade.

A still further object of my invention to provide such a device that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of my invention, however, it is to be understood that Its essential features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an isometric surface view of my invention showing its various parts, their configuration and relationship.

FIG. 2 is an orthographic top or plan view of the device of FIG. 1, showing in dotted outline the head structure positioned at the second end of the blade.

FIG. 3 is a traverse vertical cross-sectional view of the device of FIG. 1, taken on the line 3—3 thereon in the direction indicated by the arrows.

FIG. 4 is an isometric view of the device of FIG. 1 in operative position on a work piece with a user's positioning hand and saw to be guided shown in dotted outline.

FIG. 5 is a partial, elongate, vertical cross-sectional view through the interconnection of the head and blade of my device and the dowel position indicator.

FIG. 6 is a traverse vertical cross-sectional view through the interconnection of the head and support member of my device.

FIG. 7 is a vertical traverse cross-sectional view through the interconnection of the blade and support member of my device.

FIG. 8 is a cross-sectional view, taken at a position similar to FIG. 7, of a species of my invention adapted to accept a jig carried by a tool.

DESCRIPTION OF THE PREFERRED EMBODIMENT

My invention generally provides elongate tool guiding blade 10 releasably interconnected at one end to perpendicularly extending alignment head 11 with support 12 extending therebetween to provide strength and rigidity.

Blade 10 provides elongate rectilinear body 13 carrying flat sheet-like frictional element 14 on its lower surface and elongate guide element 15 along one lateral elongate edge of its upper surface. Body 13 has a length, that is its longer dimension, appropriate to guide a tool throughout the length of a cut to be made by that tool. Commonly this dimension will be something in excess of 4 feet to allow attachment to the head structure and allow use of the guide on material having a 4 foot dimension, such as a sheet of common plywood. The width of the blade is not critical so long as it be sufficient to provide a blade with sufficient rigidity to fulfill its purpose of guiding a tool along a straight line and provide sufficient support for the tool. Commonly with material such as plywood or plastic forming the blade body and having a thickness of approximately 0.25 inch, the blade width will be approximately 6 to 8 inches. The blade well may be formed of lighter metals, especially such as aluminum, and if so, the body structure may be reduced in dimension in proportion to the increased strength of the material.

Frictional member 14 is shaped similarly to body 13 of the blade to provide as large a surface as possible or frictional engagement with a work piece. Commonly, edge 16 facing a cut to be made by a guided tool will not extend quite so far laterally as edge 17 of the blade body to avoid excessive wear, which requires slightly less width for the frictional element then for the blade body. The length of the friction element is substantially coextensive with the length of blade body 13 extending away from the head structure 11. Normally, the friction element will not have thickness appreciably in excess of that of the blade body, as otherwise it will tend to maintain a cutting tool too far away from the surface of a work piece and may create some instability. The material from which element 14 is formed should be such as to create a substantial frictional engagement with an underlying rigid surface. An ideal material is a rubber compound or a rubber like polymer, and especially one having a knobby, grained or somewhat undulating surface, but other materials having appropriate physical properties may be used with my device. The friction element is maintained in mechanical interconnection with the undersurface of blade body 13 preferably by adhesion, although other mechanical means of fastening the two elements will serve the purpose of my invention.

Guide element 15 is a rectilinear member of the same length as blade body 13, but of about ⅓ or less than the width of that element. The guide element is carried along inner edge 18 of the blade body to extend toward outer edge 17, as illustrated particularly in FIG. 1, to define a tool supporting channel 19 on top of the blade body extending inwardly to outer edge 20 of the guide element. This channel is normally 4 to 6 inches in width and with this dimension, it will position most all common manually manipulatable power tools of the present day marketplace with their cutting edge at a spaced distance outwardly from edge 17 of blade body 13. Guide element 15 is normally formed of the same material as the blade body and is mechanically attached to the blade body preferably by adhesion, but other known methods accomplishing a mechanical joinder may be used. The guide element may be integrally formed with the blade if desired, especially in extruded blade structures.

Head 11 provides head body 21 of an elongate rectilinear shape and areal dimension somewhat less than that of the blade body. Commonly, the length of head body 21 and its width will be about half of those same corresponding dimensions of the blade body. A larger head structure is not necessary for the use of my invention and it merely adds to the mass and bulk of the device without providing any additional utility. The thickness of the head body is preferably somewhat greater, commonly by a factor of about three, than the thickness of the blade body to aid in assuring contact of the head with a side of a work piece upon which it is to be used. Blade facing edge 22 of head body 21 should be perpendicular to edge 17 of the blade body and normally also edge 20 of the guide element, as both of the latter edges are normally parallel to each other. Commonly to be of any particular utility, all of these edges should be linear, though it is possible for some specialized use that some sort of a curved configuration of edges 17 and 20 might be desirable and such configuration remains within the scope of my invention.

The upper surface of head body 21 defines indicator channel 23 extending inwardly from forward or cut facing end 24 for some distance to rearward indicator channel wall 25. The indicator channel is so dimensioned as to receive elongate indicator dowel 26 in a frictional engagement to positionally maintain that dowel but yet allow its removal when desired by manual force. Preferably, the marking dowel is cylindrical in shape to allow and aid its maintenance in a square-type dowel channel. If desired or required, either the marking dowel channel, marking dowel, or both may be tapered (not shown) to aid in providing an appropriate frictional engagement of the dowel in the channel.

The indicator dowel must have appropriate length to extend from position maintaining engagement with channel wall 25, or fastened engagement in channel 23, outwardly beyond end 24 of the head body a spaced distance such that it will be cut by a tool guided by my device so as to establish the guide facing edge of a cut to be made with such a tool. Various known releasable fastening structures may be used to communicate between marking dowel 26 and the structures carrying it to aid releasable positionable maintenance of the dowel, but for convenience, I find that a frictional fit of the dowel in the marking channel is preferable. It is to be noted in this regard that when the head member is assembled with the blade member, the lower surface of the blade member will enclose the upper surface of the marking dowel channel in the drawings.

Head body 21 is interconnected with blade structure 10, as illustrated, with the upper surface 27 of the head body mechanically joined to the undersurface of the blade body. Forward end 24 of the head body preferably is coplanar with forward edge 17, and in any event does not extend forwardly of edge 17 past a point where a tool guided by the blade will cut. The mechanical joinder of head to blade must be of a releasable nature to allow the head structure to be positioned at either end of the blade member. I prefer to accomplish this joinder by mechanical fastening devices such as bolts 28 or screws 29 illustrated, extending between the joined elements, though undoubtedly other similar fasteners would be operative. The use of such fasteners allows pre-definition of holes 30 in both the blade and head structure for accommodation of the fasteners so that when those holes be used, the blade and head elements are substantially in proper predetermined position with edge 20 of the guide element perpendicular to edge 22 of the head element.

Additional rigidity and positional support for the guide is provided by support member 12 which provides elongate support body 30 having mortise 31 defined in the blade end portion 32 to allow it to fit with its lower surface coplanar with the upper surface of head 11 and lower surface of blade 10. The support is fastened along its medial line to the blade member by nut-bolt combination 32 extending therebetween to provide a pivotal interconnection to allow the support to be used when the head be positioned at either end of the blade structure. The other end of support body 32 is fastened to the head body by nut-bolt combination 33 operatively communicating therebetween through appropriately defined holes. This structure provides a releasable joinder of these elements to allow positional change of the head relative to the blade, as illustrated particularly in the dashed phantom portion of the drawing of FIG. 2. The length of body 30 of the support structure must be sufficient to accomplish this purpose, but otherwise its dimensions are not critical. No portion of the support structure should extend below the plane passing through the upper surface of head 11 and lower surface of frictional element 14 carried by blade 10 so that the support would interfere with the positioning of the guide on a work piece.

Commonly, my entire guide, except for its connectors, will be formed of wood or some similarly durable and rigid polymeric or resinous plastic material. It may be formed from lighter metals, particularly such as aluminum, but oftentimes such materials create excessive mass and higher cost without providing proportionate benefits. Marking dowel 26 must be formed of some material that may be cut by a tool to be used with my invention and this material also is preferably wood or a polymeric resin having similar physical properties.

A species of guiding blade having a relatively narrow guide element 15a is shown in the drawing of FIG. 8, where it is seen to be formed in a unitary fashion with the guide blade 13 by extrusion of a polymeric plastic material. This type of structure has the added advantage in that it can slidably support jig 38 defining channel 39 to fit thereover. The jig 38 may be attached to a tool by rod 40, preferably to allow positional lateral adjustment relative to the tool, to provide fixed lateral positioning of the tool relative to the support blade of my guide. This form of blade is especially useful with routers to prevent their lateral movement away from the guiding blade during use.

Having thusly described the structure of my invention, its use may be understood.

To use my device, a guide is formed according to the foregoing specification and accompanying drawings. If the guide is to be used with a common hand manipulated, powered circular saw having the motor parallel to the saw axis, the guide is assembled as shown in FIG. 1, as that type of saw commonly has the running guide to the left (looking from the rear forwardly) of the saw blade. If the guide is to be used with a worm drive saw having the running guide to the right of a saw blade, it would be assembled with the head at the other end of the blade, as shown in the phantom portion of the illustration of FIG. 2.

The use of the guide is shown in FIG. 4. The guide here is positioned to guide saw 34 to make an elongate cut in plywood sheet 35. The particular cut 36 to be made is to be perpendicular to edge 37 of the plywood sheet. My guide is positioned with its blade 10 on :op of the plywood sheet and edge 22 of head 11 immediately adjacent edge 35 of the plywood sheet which in general will be substantially linear.

With the device in this position, and assuming a worker with principal dexterity on the right side, the saw to be guided is held in the right hand and the guide is commonly supported by the left hand, with the plywood sheet being appropriately supported for cutting by commonly used support structure not shown. In this condition, a worker's left hand commonly will support the guide structure at a medial point on support 12 and in so doing, will maintain the head against the edge of the plywood sheet and simultaneously maintain the guide with some downward pressure upon that work piece. This downward pressure will not only maintain the guide against the edge of the plywood sheet, but also will cause additional vertical force between frictional element 14 and the upper surface of the work piece to increase friction to aid positional maintenance of the guide.

Prior to this positioning, an indicator dowel 26 will have been inserted in channel 23 and the particular saw in question will have been operated and moved along tool channel 19 to cut the outward portion of that dowel projecting laterally, beyond the tool's cutting element. The dowel then will have a length appropriate to indicate the distance of a cut made by that particular saw relative to the guide blade member 10.

The guide is then manually manipulated by the operator to align the outwardly projecting end of indicator dowel 26 with the position of the cut desired to be made and when the device be so aligned, it is firmly positionally maintained. A worker then starts operation of saw 34 and inserts that saw's running guide in tool supporting channel 19 of my guide's blade structure, rearwardly of the cut to be made in the work piece. The saw is then moved forwardly in tool supporting channel 19 with its running guide against edge 20 of guide element 15 until the blade engages the work piece. The saw is then continuously moved in a forward direction at appropriate speed to complete the length of cut desired in the work piece. The saw is then removed and the work piece disposed for future processing and use.

If it be desired to use the guide with a saw having a blade projecting to the left of the running guide, it is merely necessary to release the support from the head structure, release the head structure from the first end of the blade, as illustrated in FIGS. 1 and 2, and move that head structure to the second end of the blade in the position shown in the dashed phantom illustration of FIG. 2. The support structure then is again reconnected to the head structure and the device may then be used with a worm driven saw in substantially the same fashion as described immediately herein before.

Essentially the same operation may be accomplished with other powered cutting tools such as routers, saber saws and the like. If desired, especially with the use of a router, the species of my invention illustrated in FIG. 8 may be used and an appropriate jig attached to the router to mechanically maintain the router in its appropriate lateral position relative to the guiding blade. Manually manipulated routers tend to wander from a straight course during operation and this species of guide prevents such wandering.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what 1 desire to protect by Letters Patent, and

What I claim is:

1. A guide structure for a manually manipulated powered tool on a work piece, comprising, in combination:
   an elongate guiding blade structure for positioning on a work piece with an elongate friction element on its lower surface immediately inwardly adjacent a first outer edge, and a guide element on its upper surface defining a tool supporting channel extending inwardly from the outer edge, said guide element being relatively narrow to define an elongate ridge to slidably support a jig carried by a powered tool to maintain lateral position of that powered tool relative to the guiding blade; and
   a head at one end of the guiding blade extending perpendicularly rearwardly from the first outer edge of the blade and depending a spaced distance therebelow, said head defining a channel parallel to and immediately adjacent its blade facing edge releasably carrying an indicating element extending outwardly a spaced distance from the first forward edge of the blade and adapted to be cut by a cutting tool guided by said blade said head structure being releasably attachable to said guiding blade at either end of the guiding blade to allow use of a cutting tool having a cutting element on either side of a running guide element; and support means releasably communicating between said blade structure and said head to aid rigidity between and positional integrity of said elements.

* * * * *